United States Patent
Kim et al.

(10) Patent No.: US 11,325,821 B2
(45) Date of Patent: May 10, 2022

(54) WATER EJECTING APPARATUS

(71) Applicant: LG Electronics Inc., Seoul (KR)

(72) Inventors: Minho Kim, Seoul (KR); Heesang Yoon, Seoul (KR); Hoon Jang, Seoul (KR); Dongkoo Han, Seoul (KR); Hyeonggeun Kim, Seoul (KR); Keunho Roh, Seoul (KR); Jongho Park, Seoul (KR); Younggwan Song, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/898,330

(22) Filed: Jun. 10, 2020

(65) Prior Publication Data

US 2021/0024342 A1 Jan. 28, 2021

(30) Foreign Application Priority Data

Jul. 24, 2019 (KR) ........................ 10-2019-0089633

(51) Int. Cl.
   *B67D 1/08* (2006.01)
   *B67D 1/00* (2006.01)
   (Continued)

(52) U.S. Cl.
   CPC ......... *B67D 1/0882* (2013.01); *B67D 1/0014* (2013.01); *B67D 1/0081* (2013.01);
   (Continued)

(58) Field of Classification Search
   CPC .. B67D 1/0882; B67D 1/0895; B67D 1/0081; B67D 2210/00005; B67D 2210/00002;
   (Continued)

(56) References Cited

U.S. PATENT DOCUMENTS 9,988,257 B2 * 6/2018 Schneberger ........ B67D 1/1277
10,889,483 B2 * 1/2021 Jung ........................ C02F 1/003
(Continued)

FOREIGN PATENT DOCUMENTS

KR  1020100054580  5/2010
KR     101381803    4/2014
(Continued)

OTHER PUBLICATIONS

PCT International Search Report and Written Opinion in International Appln. No. PCT/KR2020/005792, dated Aug. 7, 2020, 11 pages.

*Primary Examiner* — Frederick C Nicolas
(74) *Attorney, Agent, or Firm* — Fish & Richardson P.C.

(57) ABSTRACT

A water ejecting apparatus includes a case and a water ejection unit coupled to the case and at least partially protruding therefrom. The water ejection unit includes a fixed cover separably coupled to one side of the case and allowing a rack gear extending in a horizontal direction to be fixed thereto, a moving cover accommodated to be movable in the horizontal direction inside the fixed cover, a driving motor coupled to inside of the moving cover, a gear module configured to interwork with the driving motor, and a water ejection nozzle installed at a lower end of the moving cover and configured to eject water, in which the moving cover appears or disappears, while moving from the inside of the fixed cover in the horizontal direction or moving to the outside form the inside of the fixed cover in the horizontal direction, when the driving motor operates.

20 Claims, 11 Drawing Sheets

(51) Int. Cl.
  *B67D 1/12* (2006.01)
  *C02F 9/00* (2006.01)
  *C02F 1/00* (2006.01)

(52) U.S. Cl.
  CPC ......... *B67D 1/0895* (2013.01); *B67D 1/1277* (2013.01); *C02F 9/005* (2013.01); *B67D 2210/00002* (2013.01); *B67D 2210/00005* (2013.01); *B67D 2210/00049* (2013.01); *B67D 2210/00062* (2013.01); *C02F 1/003* (2013.01); *C02F 2307/10* (2013.01)

(58) Field of Classification Search
  CPC ................ B67D 1/0014; B67D 1/1277; B67D 2210/00062; B67D 2210/00049; C02F 1/003; C02F 9/005; C02F 2307/10
  See application file for complete search history.

(56) References Cited

U.S. PATENT DOCUMENTS

| | | | |
|---|---|---|---|
| 10,941,031 B2* | 3/2021 | Jung | .................... B67D 1/0085 |
| 2017/0050836 A1 | 2/2017 | Yoon | |
| 2018/0194608 A1 | 7/2018 | Jeon et al. | |
| 2019/0060801 A1* | 2/2019 | Jeon | ........................ C02F 1/002 |
| 2019/0060803 A1* | 2/2019 | Jeon | ........................ B01D 35/30 |
| 2019/0060805 A1* | 2/2019 | Jeon | ........................ C02F 1/003 |
| 2019/0060806 A1* | 2/2019 | Jeon | ........................ B01D 35/04 |
| 2019/0060807 A1* | 2/2019 | Jeon | ........................ C02F 1/003 |
| 2020/0377356 A1* | 12/2020 | Kim | .................... B67D 1/1405 |
| 2021/0001253 A1* | 1/2021 | Yoon | ....................... C02F 9/005 |
| 2021/0001366 A1* | 1/2021 | Yoon | ....................... F16H 19/04 |
| 2021/0001367 A1* | 1/2021 | Han | .................... B67D 1/0047 |
| 2021/0001368 A1* | 1/2021 | Kim | ..................... B05B 15/68 |
| 2021/0002117 A1* | 1/2021 | Park | .................... B67D 1/0042 |
| 2021/0002119 A1* | 1/2021 | Kim | ...................... F21V 3/0625 |
| 2021/0017009 A1* | 1/2021 | Jung | .................... B67D 1/0014 |

FOREIGN PATENT DOCUMENTS

| | | |
|---|---|---|
| KR | 1020170135806 | 12/2017 |
| KR | 1020180077380 | 7/2018 |
| KR | 1020190040948 | 4/2019 |
| KR | 1020190057852 | 5/2019 |
| WO | WO2019139359 | 7/2019 |

* cited by examiner (a)

(b)

WATER EJECTING APPARATUS

CROSS-REFERENCE TO RELATED APPLICATION

This application claims a benefit under 35 U.S.C. § 119(a) of Korean Patent Application No. 10-2019-0089633 filed on Jul. 24, 2019, on the Korean Intellectual Property Office, the entire disclosure of which is incorporated herein by reference for all purposes.

BACKGROUND OF THE DISCLOSURE

Field of the Disclosure

The present disclosure relates to a water ejecting apparatus applicable to a water purifier and a drinking water vending machine.

Discussion of the Related Art

In general, a water purifier corresponds to a device for supplying purified water from which impurities are removed by filtering predetermined water. The water purifier is widely used throughout the home appliance or industry. In particular, the water purifier may be provided as a household water purifier that provides purified water that can be consumed by a user.

The water purifier includes a water purifier main body to which a filter and the like are mounted, and a water ejection unit for providing filtered water from the water purifier main body. In general, the water ejection unit is fixed to the front surface of the water purifier main body. Accordingly, the user can take purified water by placing a container for accommodating water or the like in the water ejection unit.

With such a structure, since the user is constrained to the position of the water ejection unit, there is a problem in that the user's convenience cannot be secured.

In some examples, a configuration that a water ejection unit is provided on one side of the main body and the water ejection unit which is rotated at a predetermined angle from the main body and coupled thereto is disclosed. In particular, the water ejection unit is separated from the main body by the user and rotated by a set angle to be coupled thereto again. In other words, the user can change the position of the water ejection unit to a required position.

In the conventional case as described above, since the length of the water ejection unit in the front and rear direction are fixed, there is also a problem in that it is difficult to receive water in a container having a large inlet size.

In other words, in the prior art, a water ejection unit movable in the front and rear direction is not presented, and the interval between the water ejection unit and the front of the case is fixed, and accordingly, there is a problem in that it is difficult to eject water to containers of various sizes and shapes.

In addition, as the water ejection position is fixed, there is a problem in that the user's convenience is limited.

SUMMARY OF THE DISCLOSURE

The present disclosure has been proposed to solve this problem, and an object of the present disclosure is to provide a water ejecting apparatus in which a water ejection nozzle from which water is ejected by the operation of a driving motor is moved in a horizontal direction.

In addition, an object of the present disclosure is to provide a water ejecting apparatus that is provided not only to rotate, but also to be movable in a horizontal direction, so that the interval between the case and the water ejection nozzle can be adjusted, thereby increasing user convenience.

In addition, an object of the present disclosure is to provide a water ejecting apparatus capable of preventing shaking when the water ejection unit is horizontally moved.

In addition, an object of the present disclosure is to provide a water ejecting apparatus capable of changing the position of the water extraction nozzle according to various container inlet sizes and positions in which the containers are placed.

A water ejecting apparatus according to an aspect of the present disclosure includes a water purifier main body including a case forming an outer appearance, and a water ejection unit, at least a part of which is coupled to protrude from one side of the case.

The water ejection unit includes a fixed cover separably coupled to one side of the case and allowing a rack gear extending in a horizontal direction to be fixed thereto, a moving cover accommodated to be movable in the horizontal direction inside the fixed cover, a driving motor coupled to inside of the moving cover, a gear module configured to interwork with the driving motor, and a water ejection nozzle installed at a lower end of the moving cover and configured to eject water.

The moving cover appears or disappears, while moving from the inside of the fixed cover in the horizontal direction or moving to the outside form the inside of the fixed cover in the horizontal direction, when the driving motor operates.

A horizontal interval between the water ejection nozzle and the case is varied when the driving motor operates.

The gear module includes a gear bracket coupled to the moving cover, and a pinion gear rotatably installed in the gear bracket and engaged with the rack gear.

The pinion gear rotates along the rack gear and the moving cover relatively moves in the horizontal direction with respect to the fixed cover according to the operation of the driving motor.

The fixed cover further includes a guide bar disposed in parallel to the rack gear on the opposite side of the rack gear, and the gear bracket is in contact with and supported by the guide bar.

The gear bracket has a guide bar passage hole formed to allow the guide bar to pass therethrough.

An anti-friction member for reducing frictional force with the guide bar is inserted in the guide bar passage hole.

The driving motor includes a motor shaft and a motor gear connected to the motor shaft.

The gear module includes a first gear engaged with the motor gear;

a second gear coaxially provided with the first gear, a third gear engaged with the second gear, and a fourth gear coaxially provided with the third gear and engaged with the rack gear.

The fixed cover has a first opening opened along a moving direction of the moving cover on a bottom surface thereof, and a bottom surface of the moving cover is exposed downward along the first opening.

The fixed cover has horizontal extending portions extending in mutually facing directions at both lower ends defining the first opening.

The moving cover has step portions formed to be concave upward at both end portions thereof so as to be seated at an upper end of the horizontal extending portion.

The fixed cover is opened in front surface to form a second opening, and the moving cover moves outward from the fixed cover through the second opening.

The fixed cover and the moving cover are convex upward.

A ring-shaped rotator is rotatably seated on a front inner side of the case, and the fixed cover is coupled to one side of the rotator.

The water ejecting apparatus further includes a first sensor provided in the case or the water ejection unit and configured to sense a container placed near the case.

A top cover forming an upper surface of the case or the water ejection unit includes an input unit configured to instruct a rotation operation of the driving motor or an opening and closing operation of a water ejection pipe connected to the water ejection nozzle.

The water ejecting apparatus further includes a second sensor for sensing the amount of rotation, the rotational direction, the rotational speed of the driving motor, whether the load of the driving motor is abruptly changed.

The water ejecting apparatus further includes a controller connected to the input unit and the first sensor or the second sensor to control the operation of the driving motor.

DESCRIPTION OF SPECIFIC EMBODIMENTS

Figure 1:
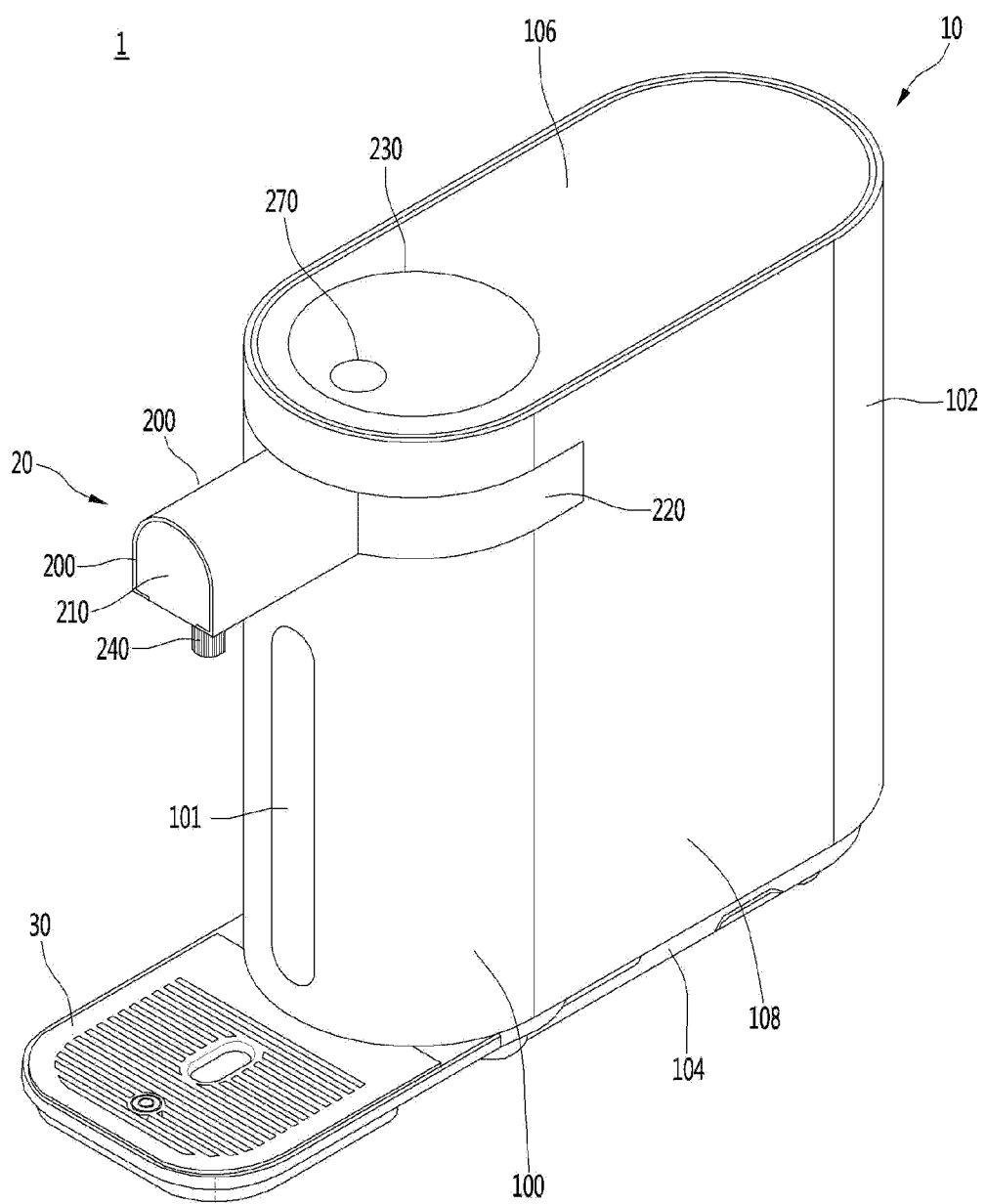
FIG. 1 is a view illustrating a water ejecting apparatus according to an embodiment of the present disclosure.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

FIG. 1 is a view illustrating a water ejecting apparatus according to an embodiment of the present disclosure.

In the following description, the water ejecting apparatus may refer to various types of known water ejecting apparatus that, when raw water flows in, such as a water purifier, a drinking water vending machine, and a coffee machine, supply the introduced raw water in a state where a user can drink.

As illustrated in FIG. 1, the water ejecting apparatus 1 according to the aspect of the present disclosure includes a case 10 forming an outer appearance and a water ejection unit 20 coupled to one side of the case 10.

The case 10 is provided to form an inner space in which various components to be described later are installed. For example, the case 10 may have an elliptical cross-section, as illustrated in FIG. 1. However, since the elliptical cross-section is an exemplary shape, the case 10 may be provided in various shapes.

The case 10 may be formed by combining a plurality of plates. In detail, the case 10 includes a front cover 100, a rear cover 102, a base cover 104, a top cover 106, and a pair of side covers 108. In this case, each cover may form the front surface, rear surface, bottom surface, top surface, and both side surfaces of the outer appearance of the water ejecting apparatus 1.

Each cover may be coupled to each other through a coupling member or coupling structure. In detail, the front cover 100 and the rear cover 102 are disposed to be spaced apart in the front and rear direction. In addition, the pair of side covers 108 may connect the front cover 100 and the rear cover 102, respectively, to form a periphery of the water ejecting apparatus 1.

In addition, the top cover 106 is coupled to the upper ends of the front cover 100, the rear cover 102, and the pair of side covers 108. In addition, the base cover 104 is coupled to the lower ends of the front cover 100, the rear cover 102, and the pair of side covers 108. It is understood that the base cover 104 is a portion that is seated on the bottom surface on which the water ejecting apparatus 1 is installed.

In this case, the front cover 100 and the rear cover 102 may be bent to a predetermined curvature, and the pair of side covers 108 may be formed as a flat plate. In detail, the front cover 100 and the rear cover 102 may be respectively convex in the front and rear direction.

In addition, the base cover 104 and the top cover 106 are formed to correspond to the front cover 100 and the rear cover 102 so that front and rear ends are rounded.

In this case, a flat portion 1002 may be formed in the central portion of the front cover 100 in the vertical direction. The flat portion 1002 may function as a center point during rotation of the water ejection unit 20 to be described later.

In addition, the flat portion 1002 may be understood as a recessed portion in the front cover 100 convexly protruding forward. In this case, the front surface of the front cover 100 corresponds to a portion where the user arranges a container (hereinafter, a water ejection container) such as a cup for water ejection. Accordingly, since the flat portion 101 is formed, the user can place the water ejection container more deeply, and there is an advantage that the water ejection container can be stably supported.

In addition, the water ejecting apparatus 1 includes a tray 30 on which the water ejection container is seated. The tray 30 is connected to the base cover 104 and is disposed to protrude forward. Accordingly, it can be understood that the tray 30 forms the lower surface of the water ejecting apparatus 1 together with the base cover 104.

In addition, the tray 30 may be located vertically below the water ejection nozzle 240 to be described later. In addition, the tray 30 may be formed in a structure for storing water that is not accommodated in the water ejection container and falls. For example, the tray 30 may be provided in a form having a grill and a storage portion which is provided below the grill.

The water ejection unit 20 may protrude from one side of the case 10 and be coupled thereto. In detail, the water ejection unit 20 may be disposed to protrude forward from the front cover 100. In addition, the water ejection unit 20 may be coupled to communicate with the case 10.

The water ejection unit 20 includes a rotator 220, a fixed cover 200 connected to the rotator 220, and a moving cover 210 movably coupled to the fixed cover 200 in a horizontal direction. Each cover may form the outer appearance of the water ejection unit 20.

Figure 3:
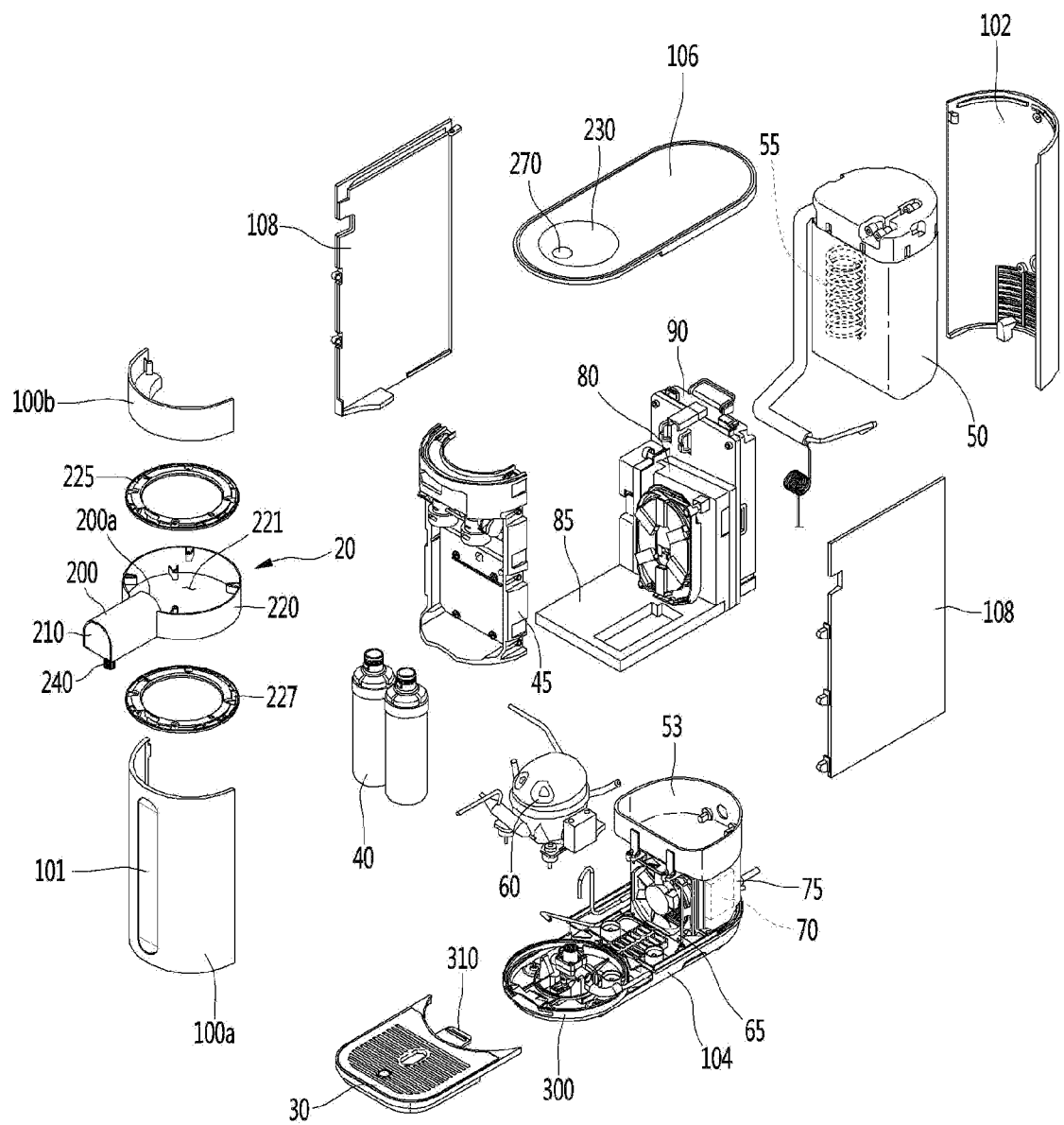
FIGS. 3 and 4 are views illustrating a state where the water ejecting apparatus according to an embodiment of the present disclosure is disassembled.

The rotator 220 corresponds to a configuration that is seated on the case 10. Referring to FIG. 3 to be described later, the rotator 220 is provided in a cylindrical shape corresponding to the curvature of the front cover 100. In addition, the rotator 220 is disposed such that the front cover 100 is divided into upper and lower portions. Accordingly, the front cover 100 is divided into a lower front cover 100*a* coupled to the base cover 104 and an upper front cover 100*b* coupled to the top cover 106.

In this case, the upper front cover 100*b* has a shorter vertical length than the lower front cover 100*a*. Accordingly, the upper front cover 100*b* is understood as an auxiliary portion for forming the outer appearance. The lower front cover 100*a* is understood as a portion which is formed with the flat portion 101 and disposed on one side of the water ejection container.

The rotator 220 is exposed to the outside through a interval between the lower front cover 100*a* and the upper front cover 100*b*.

In addition, the fixed cover 200 may be connected to the rotator 220 through an interval between the lower front cover 100*a* and the upper front cover 100*b*.

The fixed cover 200 may be formed integrally with the rotator 220.

At least a portion of the rear end 200*a* of the fixed cover 200 may be accommodated in the space portion 221 provided inside the rotator 220.

In addition, while the moving cover 210 moves in the horizontal direction along the fixed cover 200, at least a portion thereof may be accommodated in the space portion 221 provided inside the rotator 220. For example, when the moving cover 210 moves in the central direction of the rotator 220, the moving cover 210 can be accommodated in the space portion 221 provided on the inside of the rotator 220 to protrude more than the rear end 200*a* of the fixed cover 200.

Meanwhile, the fixed cover 200 and the moving cover 210 are disposed to protrude forward from the front cover 100. In particular, the fixed cover 200 and the moving cover 210 are provided in a shape protruding outwardly from the rotator 220.

The top cover 106 may be provided with various input units 230 for a user to input a predetermined command. The input unit 230 may be provided in various forms such as a button method and a touch method. In addition, although the input unit 230 is illustrated as one in FIG. 1, the input unit 230 may be provided in various numbers. The input unit 230 may include a water ejection button 270 for inputting a water ejection command.

The input unit 230 may instruct a rotational operation of a driving motor 250 (refer to FIG. 9) to be described later or may instruct an opening/closing operation of a water ejection valve installed in a water ejection pipe connected to the water ejection nozzle.

In addition, the input unit 230 may be formed on the top cover 106 forming the upper surface of the case 910 or may be formed on the water ejection unit 20, and may be formed in both sides of the top cover 106 and the water ejection unit 20.

In addition, the water ejection unit 20 includes a water ejection nozzle 240 through which a predetermined amount of water is ejected. The water ejection nozzle 240 is installed to extend downward and may be disposed in a state of being exposed under the moving cover 210. As described above, the tray 30 is disposed vertically below the water ejection nozzle 240.

In addition, a water ejection pipe (not illustrated) connected to the water ejection nozzle 240 is disposed inside the water ejection unit 20. The water ejection pipe (not illustrated) may extend inside the water ejection unit 20 from the inside of the case 10 to be coupled to the water ejection nozzle 240.

At this time, the water ejection unit 20 of the water dispensing device 1 according to the aspect of the present disclosure may be moved to change the position of the water ejection nozzle 240. Hereinafter, this will be described in detail.

Figure 2:
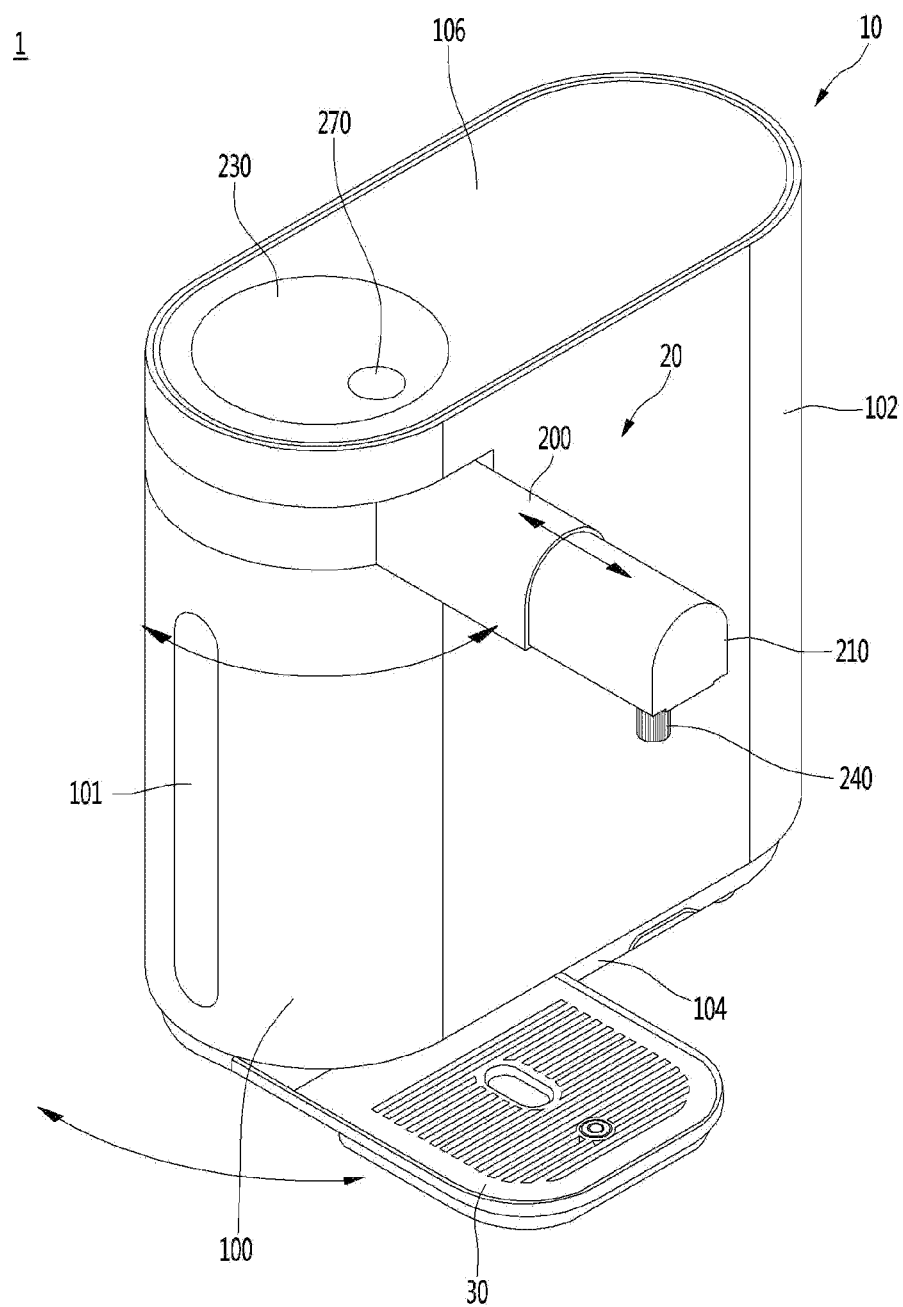
FIG. 2 is a view illustrating a state where the position of the water extraction nozzle of the water ejecting apparatus is changed according to an embodiment of the present disclosure.

FIG. 2 is a view illustrating a state where the position of the water extraction nozzle of the water ejecting apparatus is changed according to an embodiment of the present disclosure.

As illustrated in FIG. 2, the water ejection unit 20 may rotate or move linearly in the horizontal direction. In addition, the tray 30 may be rotated together with the rotation of the water ejection nozzle 240.

First, the rotation of the water ejection unit 20 will be described. The water ejection unit 20 may be rotated as the rotator 220 rotates. In other words, as the rotator 220 is rotated, the fixed cover 200, the moving cover 210, and the water ejection nozzle 240 may be rotated.

At this time, the water ejection unit 20 may be rotated along the front cover 100 and has a rotation radius of about 180 degrees. In addition, the input unit 230 may be connected to the rotator 220 and rotate together with the water ejection unit 20.

The tray 30 is rotatably coupled to the base cover 104 and rotates to correspond to the water ejection unit 20. Accordingly, the tray 30 also has a rotation radius of about 180 degrees.

In addition, the horizontal movement of the water ejection unit 20 will be described. The water ejection unit 20 includes a fixed cover 200 connected to the rotator 200 and a moving cover 210 that moves in a horizontal direction with respect to the fixed cover 200. The moving cover 210 may be disposed inside the fixed cover 200 and move along the fixed cover 200. In addition, the water ejection nozzle 240 may be installed on the moving cover 210 and move together with the moving cover 210.

The rotation and horizontal movement of the water ejection unit 20 may be performed independently of each other. In other words, the rotation and horizontal movement of the water ejection unit 20 may be performed simultaneously or separately.

In addition, the water ejection unit 20 may be provided in a structure that rotates or moves horizontally. In other words, the water ejection unit 20 may have a structure capable of only horizontal movement without being rotated.

Hereinafter, the internal configuration of the water ejecting apparatus 1 will be described in detail.

Figure 4:
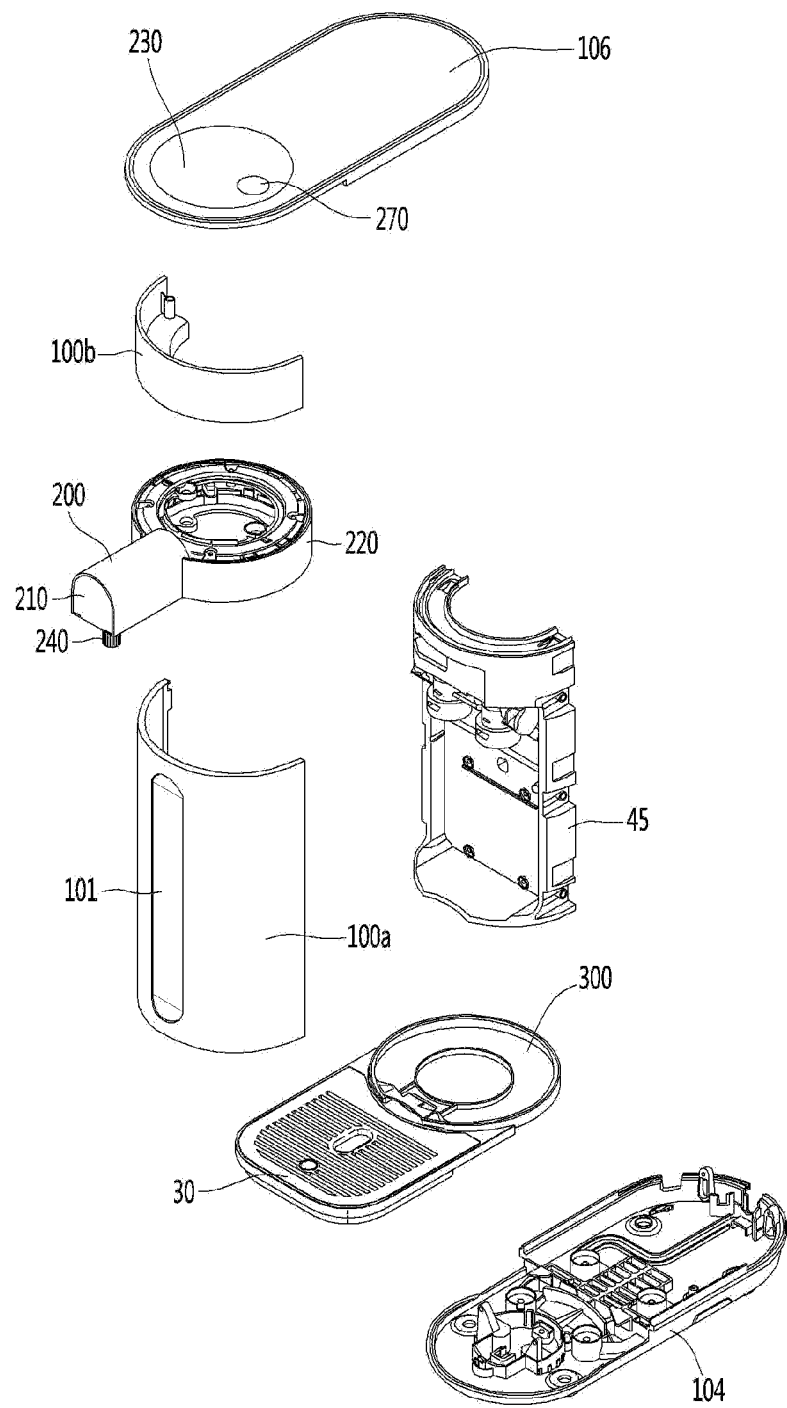

FIGS. 3 and 4 are views illustrating a state where the water ejecting apparatus according to an embodiment of the present disclosure is disassembled. FIG. 4 is a view illustrating some of the configurations illustrated in FIG. 3 in different combinations for convenience of understanding.

The water ejecting apparatus 1 illustrated in FIGS. 3 and 4 has a configuration capable of supplying purified water, cold water, and hot water. However, this is an example, and the configuration of the water ejecting apparatus 1 is not limited thereto and may be omitted or added. In addition, for convenience of the illustration, a pipe through which water flows is omitted and illustrated.

As illustrated in FIGS. 3 and 4, the water ejecting apparatus 1 includes a filter 40, a cooling tank 50, a compressor 60, a condenser 70, and an induction heating assembly 80 disposed inside the case 10. In addition, a filter bracket 45 on which the filter 40 is mounted is provided inside the case 10.

The filter bracket 45 may be seated on the base cover 104 adjacent to the front cover 100. In addition, the rotator 220 may be seated on an upper portion of the filter bracket 45. In other words, the filter bracket 45 may be provided at a height corresponding to the lower front cover 100a.

The upper and lower ends of the filter bracket 45 are provided in the shape of a semicircle having a curvature corresponding to that of the front cover 100. In addition, the filter bracket 45 forms a space recessed to the rear so that the filter 40 can be accommodated.

In detail, the filter 40 is disposed in a space formed between the filter bracket 45 and the front cover 100. The filter 40 is for purification of supplied raw water (tap water) and may be configured to combine filters having various functions. In other words, the filters 40 may be provided in various numbers and in various shapes.

In addition, various valves (not illustrated) may be provided on the filter bracket 45 to be connected to respective pipes. For example, a pipe through which water flowing into the filter 40 flows, a pipe through which purified water flows from the filter 40, and the like may be connected to the filter bracket.

In this case, the water purified by the filter 40 may be supplied to the cooling tank 50, the induction heating assembly 80, or the water ejection nozzle 240. In other words, the water purified by the filter 40 may be supplied in the form of cold water, hot water, and purified water.

The compressor 60 and the condenser 70 form a refrigeration cycle together with the evaporator 55 disposed inside the cooling tank 50. In other words, the compressor 60 and the condenser 70 may be understood as a configuration for supplying cold water.

The compressor 60 and the condenser 70 may be seated on the base cover 104. In detail, the compressor 60 and the condenser 70 may be disposed behind the filter bracket 45. In addition, a cooling fan 65 is disposed between the compressor 60 and the condenser 70. It is understood that the cooling fan 65 is configured to cool the compressor 60 and the condenser 70.

In addition, the compressor 60 may be an inverter type compressor capable of adjusting the cooling capacity by varying the frequency. Accordingly, the cooling of the purified water can be efficiently performed, thereby reducing power consumption.

In addition, the condenser 70 may be located at a position corresponding to the discharge port formed in the rear cover 102. The condenser 70 may be formed by bending a flat tube type refrigerant tube a plurality of times in order to efficiently use space and improve heat exchange efficiency at the same time.

In addition, the condenser 70 may be disposed to be accommodated in the condenser bracket 75. The condenser bracket 75 is provided to form a space having a shape corresponding to the overall shape of the condenser 70 to accommodate the condenser 70. In addition, the condenser bracket 75 is formed such that portions facing the cooling fan 65 and the discharge port of the rear cover 102 are opened, respectively, to effectively cool the condenser 70.

A tank mounting portion 53 in which the cooling tank 50 is accommodated is disposed above the condensation bracket 75. The tank mounting portion 53 is understood as a configuration for fixing the cooling tank 50. For example, the tank mounting portion 53 is provided so that the lower end portion of the cooling tank 50 is inserted.

The cooling tank 50 is to make cold water by cooling the purified water and is filled with the cooling water for heat exchange with the incoming purified water. In addition, an evaporator 55 for cooling the cooling water may be accommodated in the cooling tank 50. In addition, the purified water may be cooled by allowing the purified water to pass through the cooling tank.

The induction heating assembly 80 is for heating purified water and is configured to heat purified water using an induction heating (IH) method. The induction heating assembly 80 may immediately and rapidly heat water during hot water ejection manipulation and may control the output of a magnetic field to heat purified water to a desired temperature and provide the purified water to the user. Therefore, hot water of a desired temperature can be ejected according to a user's manipulation.

In addition, the induction heating assembly 80 is installed to be seated on the support plate 85. The support plate 85 is provided to extend from the filter bracket 45 to the cooling tank 50. In addition, the support plate 85 is provided above the compressor 160.

In addition, the water ejecting apparatus 1 includes a controller 90. The controller 90 may control the driving of the water ejecting apparatus 1 by controlling the above-described components. In detail, the controller 90 is configured to control the compressor 60, the cooling fan 65, various valves, sensors, the induction heating assembly 80, or the like. The controller 90 may be modularized by a combination of PCBs divided into a plurality of portions for each function.

In addition, the controller 90 may function to heat the purified water together with the induction heating assembly 80. Accordingly, the controller 90 is disposed on one side of the induction heating assembly 80. In detail, the controller may be coupled to the induction heating assembly 80 in a single module state and seated on the support plate 85.

In addition, the water ejecting apparatus 1 is provided with a rotating structure of the water ejection unit 20. In other words, a structure in which the rotator 220 and the tray 30 are rotatably provided is provided.

As illustrated in FIGS. 3 and 4, rotation mounting portions 225 and 227 coupled to the rotator 220 are provided. The rotation mounting portions 225 and 227 are provided in a ring shape having an outer diameter corresponding to the rotator 220.

The rotation mounting portions include an upper rotation mounting portion 225 coupled to an upper end of the rotator 200 and a lower rotation mounting portion 227 coupled to a lower end of the rotator 200. The lower rotation mounting portion 227 may be fixed to the upper end of the filter bracket 45. In addition, the upper rotation mounting portion 225 may be fixed to the lower end of the upper front cover 110*b*.

In addition, as illustrated in FIGS. 3 and 4, a tray mounting portion 300 coupled to the tray 30 is provided. The tray mounting portion 300 is fixed to the base cover 104 and has a ring shape having an outer diameter corresponding to the front end of the base cover 104.

The tray 30 may be provided with a tray hook 310 coupled to the tray mounting portion 300. In other words, the tray 30 is detachably hook-coupled to the tray mounting portion 300. Therefore, the user can easily separate the tray 30 and then wash the tray.

Hereinafter, the horizontal movement structure of the water ejection unit 20 will be described in detail.

Figure 5:
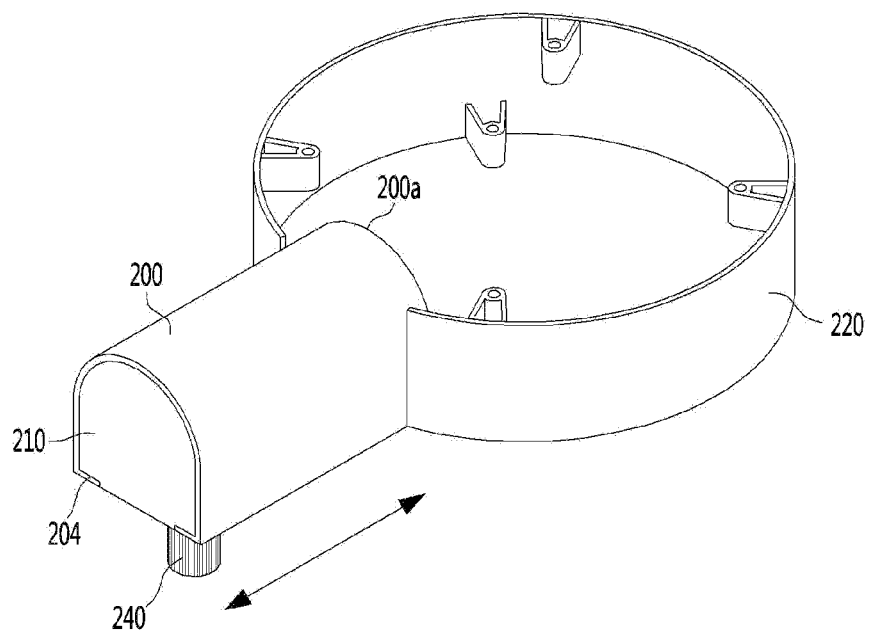
FIG. 5 is a perspective view illustrating a water ejection unit, which is a main component of the present disclosure.
Figure 6:
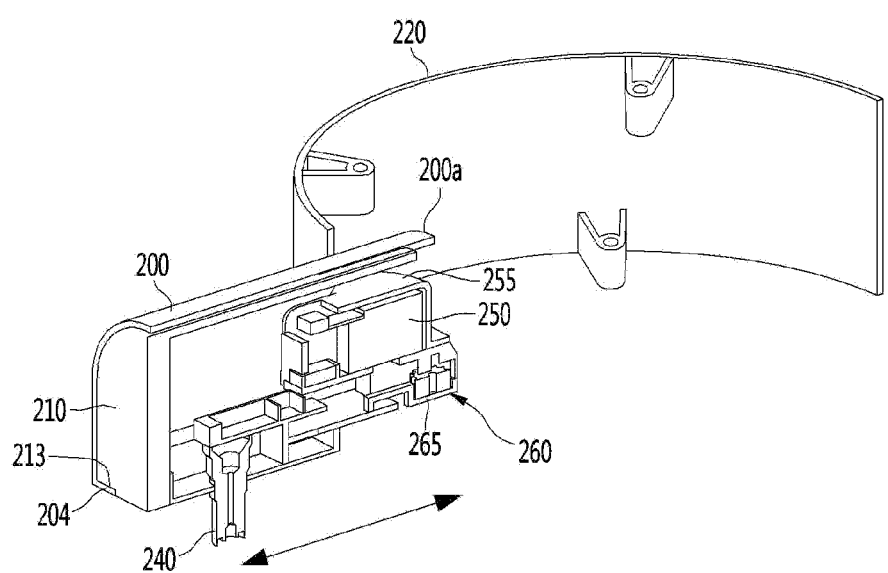
FIG. 6 is a view illustrating a cross-section of the water ejection unit illustrated in FIG. 5.
Figure 7:
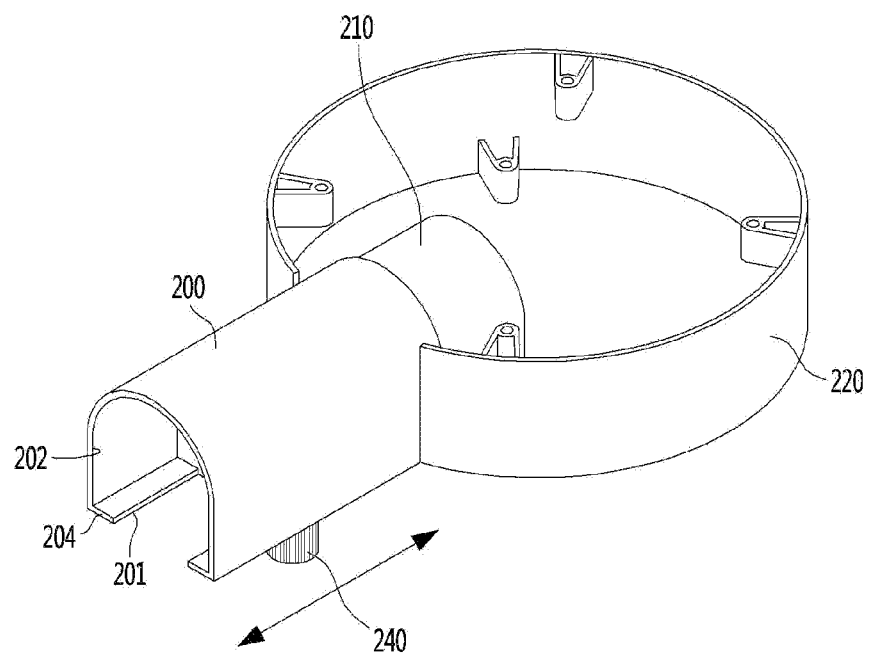
FIG. 7 is a perspective view illustrating the operating state of the water ejection unit, which is a major component of the present disclosure.
Figure 8:
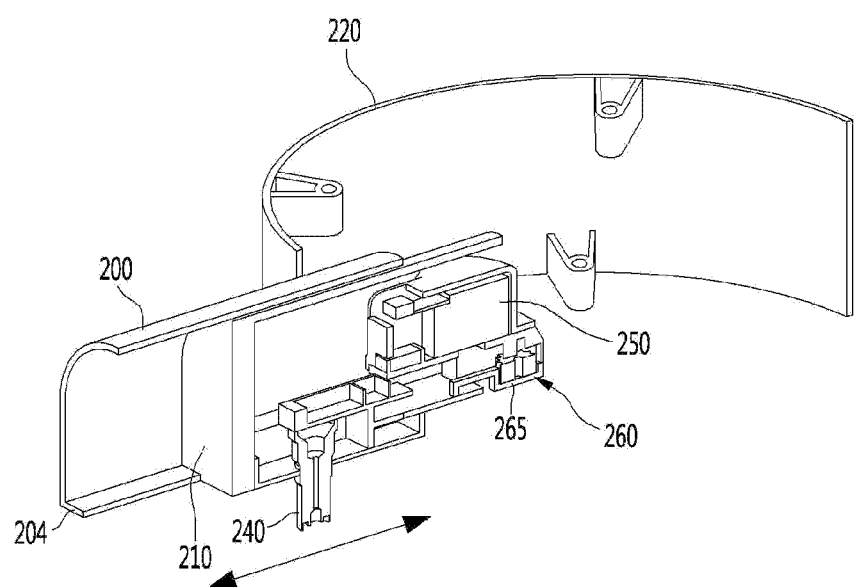
FIG. 8 is a view illustrating a cross-section of the water ejection unit illustrated in FIG. 7.

FIG. 5 is a perspective view illustrating a water ejection unit, which is a main component of the present disclosure, FIG. 6 is a view illustrating a cross-section of the water ejection unit illustrated in FIG. 5, FIG. 7 is a perspective view illustrating the operating state of the water ejection unit, which is a major component of the present disclosure, and FIG. 8 is a view illustrating a cross-section of the water ejection unit illustrated in FIG. 7.

The water ejecting apparatus according to an embodiment of the present disclosure has a structure in which the moving cover 210 in which the water extraction nozzle 240 is installed moves in the horizontal direction.

For example, the moving cover 210 has a structure that moves in the horizontal direction by a rack and pinion and a motor.

As another example, the moving cover 210 has a structure that automatically moves horizontally by a rack and pinion, a motor, and a sensor.

Conventionally, there is no function corresponding to the various cups by moving the water ejection nozzle in the front, rear, left, and right directions.

According to the present disclosure, while the water ejection nozzle 240 rotates in the horizontal direction by the rotator 220, the water ejection nozzle 240 is moved in the front and rear direction so that the interval between the water ejection nozzle 240 and the case 10 can be varied.

In detail, the water ejection nozzle 240 can move in the front and rear direction by the rack and pinion structure and the motor built into the water ejection unit 20.

Referring to FIGS. 5 to 8, the water ejection unit 20 may include a fixed cover 200 which is coupled to a side of the case 10 and to which the rack gear 206 (refer to FIG. 10) extending in the horizontal direction is fixed; a moving cover 210 movably accommodated in the horizontal direction (front and rear direction) inside the fixed cover 200, a driving motor 250 coupled to the inside of the moving cover 210, and a gear module 260 that interworks with the driving motor 250.

In addition, the water ejection nozzle 240 is installed at the lower end of the moving cover 210 to eject water downward.

According to the present disclosure, when the driving motor 250 operates, the moving cover 20 appears or disappears, while moving from the inside of the fixed cover 200 in a horizontal direction or moving to the outside from the inside of the fixed cover 200 in a horizontal direction.

In addition, when the moving cover 210 moves in the horizontal direction during operation of the driving motor 250, the horizontal interval between the water ejection nozzle 240 and the case 10 is changed.

For example, when the moving cover 210 moves from the inside to the outside of the fixed cover 200 while the driving motor 250 rotates in one direction, the horizontal interval between the water ejection nozzle 240 and the case 10 increases.

As another example, when the moving cover 210 moves from the outside to the inside of the fixed cover 200 while the driving motor 250 rotates in the one direction and the direction opposite thereto, the horizontal interval between the water ejection nozzle 240 and the case 10 is reduced.

The driving motor 250 may be covered by a motor cover 255.

Referring to FIG. 6, the motor cover 255 is disposed on the upper side, and the driving motor 250 is disposed below the motor cover. In addition, the gear module 260 is disposed below the driving motor.

Meanwhile, referring to FIG. 9, in the gear module 260, the first gear 261 is disposed on the upper side, the second gear 262 is disposed on the lower side of the first gear 261, and the third gear 263 may be disposed below the second gear 262, and a fourth gear 264 may be disposed below the third gear 263.

Then, the fourth gear 264 rotates in engagement with the rack gear 206 disposed at the lower end of the fixed cover 200.

In addition, the gear module 260 may include a plurality of gears rotated by the driving motor 250. In addition, the gear module 260 may include a gear bracket 265 coupled to the moving cover 210 and a pinion gear 264 rotatably installed on the gear bracket 265 to engage the rack gear 206.

According to this, the pinion gear 264 rotates along the rack gear 206 by the operation of the driving motor 250, and the moving cover 210 can move horizontally relative to the fixed cover 200.

For example, when the driving motor 250 operates in a state where the water ejection unit 20 is located in the center of the case 10 (the state of FIG. 1), the moving cover 210 and the water extraction nozzle 240) can move in the front and rear direction.

The gear bracket 265 may have first guide protrusions protruding from both side surfaces thereof or first guide grooves concave inwardly from both side surfaces thereof.

In addition, second guide grooves into which the first guide projections are fitted may be formed on both sides of the fixing cover 200, or second guide projections fitted into the second guide grooves may be formed on both sides of the fixing cover 200.

Referring back to FIGS. 5 to 8, the fixed cover 200 forms a first opening 201 opened along the moving direction of the moving cover 210 on the bottom surface, and the bottom surface of the moving cover 210 and the water ejection nozzle 240 may be exposed downwardly through the first opening 201.

In addition, the fixing cover 200 may be formed with horizontal extension portions 204 extending in opposite directions at both lower ends defining the first opening 201.

The horizontal extension portion 204 may form a portion of the bottom surface of the fixed cover 200. In addition, the first opening 201 may be formed between the horizontal extension portions 204 formed on both sides of the fixed cover 200.

In addition, the moving cover 210 may be formed with a step portion 213 which is concave upwardly to be seated on the upper end of the horizontal extension portion 204 at both end portions.

The step portion 213 may be concave upwardly as much as the thickness of the horizontal extension portion 204.

The step portion 213 may be concave from the outside to the inside with respect to the horizontal direction by the length of the horizontal extension portion 204 protruding in the horizontal direction.

The horizontal extension portion 204 is accommodated in the concave space of the step portion 213, and accordingly, the moving cover 210 can be moved while the fixed cover 200 is contacted and supported in the vertical and horizontal directions.

A stopper limiting the horizontal movement range of the moving cover 210 may be formed to protrude from the horizontal extension portion 204.

In addition, the fixed cover 200 and the moving cover 210 may have an upwardly convex shape.

In addition, the fixed cover 200 is provided with guide walls facing each other at both end portions defining the first opening 201, and the moving cover 210 is provided with a guide piece which is supported in contact with the guide wall at both end portions.

The guide piece may include a guide rod extending in the vertical direction at both end portions of the moving cover, and a guide ring inserted to surround the guide rod and supported in contact with the guide wall.

The guide ring may be made of an elastic material such as rubber and silicone.

Accordingly, when the moving cover moves along the fixed cover, the guide ring is supported in contact with the guide wall.

Therefore, the clearance between the moving cover and the fixed cover is prevented, and the horizontal movement operation of the moving cover can be performed stably.

In addition, the front surface of the fixed cover 200 is opened to form a second opening 202, and the moving cover 210 can move to the outside of the fixed cover 200 through the second opening 202.

Figure 9:
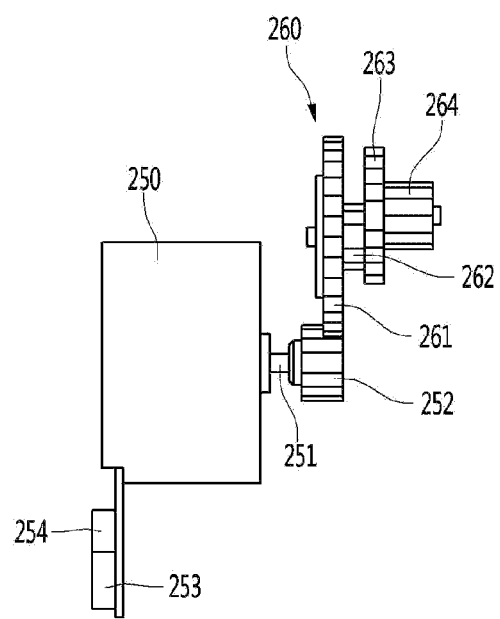
FIG. 9 is a side view illustrating a state where the driving motor and the gear unit are connected.
Figure 10:
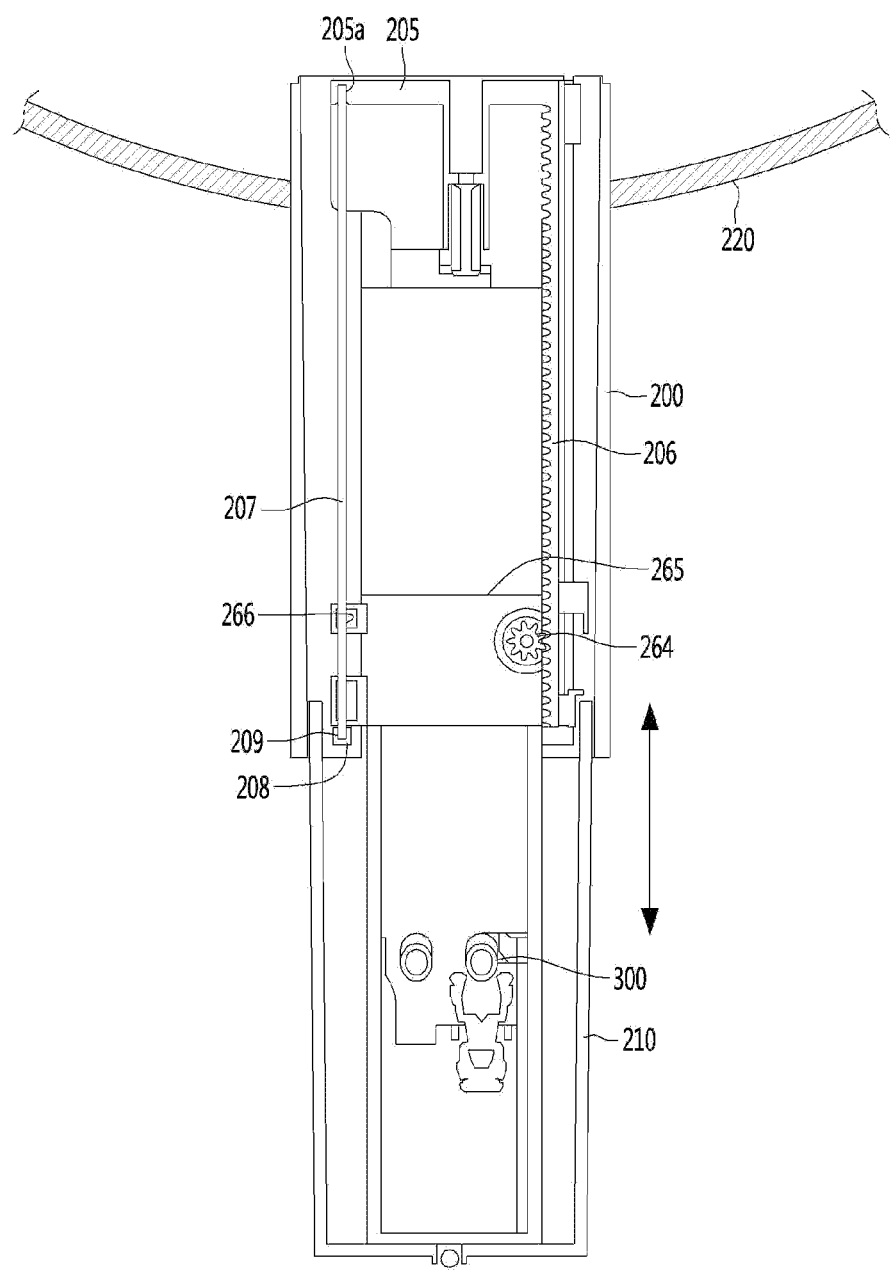
FIG. 10 is a cross-sectional view of the water ejection unit illustrating a state where the moving cover is horizontally moved to the outside of the fixed cover.
Figure 11:
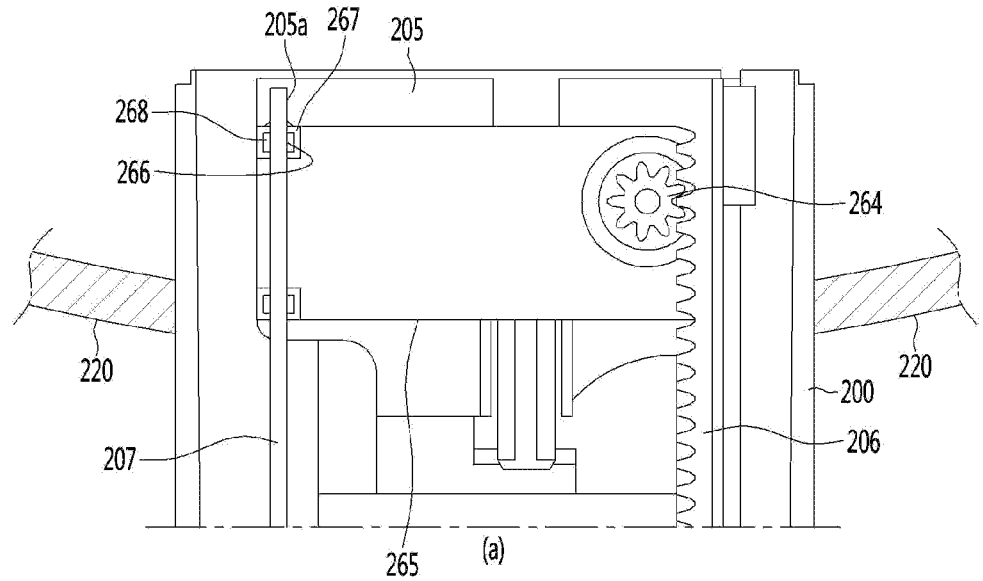
FIG. 11 is a cross-sectional view illustrating the water ejection unit for each position of the moving cover.
Figure 11:
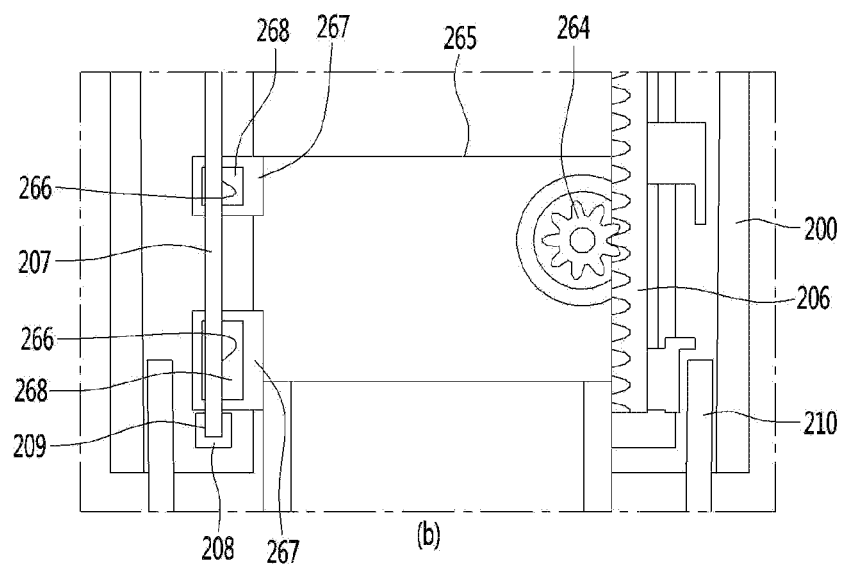

FIG. 9 is a side view illustrating a state where the driving motor and the gear unit are connected, FIG. 10 is a cross-sectional view of the water ejection unit illustrating a state where the moving cover is horizontally moved to the outside of the fixed cover, and FIG. 11 is a cross-sectional view illustrating the water ejection unit for each position of the moving cover.

Referring to FIGS. 9 to 11, the gear module 260 includes the first gear 261, the second gear 262, the third gear 263, and the fourth gear which are mounted on the gear bracket 265. In this case, the number and shape of the gears are exemplary.

The fourth gear refers to the pinion gear 264.

The first gear 261 corresponds to a gear engaging with the motor gear 252 connected to the rotation shaft 251 of the motor 250. In addition, the second gear 262 is coaxially connected to the first gear 261. In this case, the first gear 261 and the second gear 262 may be formed as one gear.

The size (diameter) of the first gear 261 may be larger than the size (diameter) of the second gear 262.

The third gear 263 corresponds to a gear engaging with the second gear 262. In addition, the fourth gear 264 is coaxially connected to the third gear 263. In this case, the third gear 263 and the fourth gear 264 may be formed as one gear.

The size (diameter) of the third gear 263 may be larger than the size (diameter) of the fourth gear 264.

In addition, the fourth gear 264 engages with the rack gear 206. In this case, the rack gear 206 is formed on the fixed cover 200 and corresponds to a fixed configuration. In addition, the fourth gear 264 is mounted on the gear bracket 265 and corresponds to a configuration coupled to the moving cover 210. Accordingly, as the fourth gear 264 rotates, the moving cover 210 may be moved.

As described above, as the gear module 260 is composed of several gears, the gear module 260 may function as a reduction gear.

Meanwhile, as in the present disclosure, when the moving cover 210 moves horizontally along the fixed cover 200, there is a problem that the moving cover 210 shakes due to the clearance, or the horizontal movement of the moving cover 210 is unstable.

In particular, when the moving cover 210 is exposed to the outside of the fixed cover 200, the moving cover 210 and the fixed cover 200 are gradually separated, and accordingly, as the clearance is increased, there was a problem that the bending and shaking phenomena occur.

Therefore, even if it is used repeatedly for a long time, a guide means is needed to hold the clearance so that the moving cover 210 moves in a straight line along the fixed cover 200, Referring to FIGS. 10 to 11, a guide bar 207 may be mounted on the fixed cover 200.

The guide bar 207 may be mounted on the lower side of the fixed cover 200.

For example, a guide bar 207 may be mounted on one lower end of the fixed cover 200, and a rack gear 206 may be mounted on the other lower end of the fixed cover 200.

The rack gear 206 may be integrally formed with the first plate 205 forming a portion of the bottom surface of the fixed cover 200.

With the configuration of the guide bar 207, when the moving cover 210 is horizontally moved, a phenomenon in which the clearance occurs in the left and right direction can be improved.

The guide bar 207 may be formed of a metal material.

In addition, the guide bar 207 may be formed in a cylindrical shape.

In addition, the guide bar 207 may be formed on both sides of the fixed cover 200.

The rear end of the guide bar 207 (the upper end with respect to FIG. 11) may be fixed to the first plate 205. In addition, the front end of the guide bar 207 (the lower end with respect to FIG. 11) may be fixed to the front end of the fixing cover 200 (the lower end with respect to FIG. 11).

The first plate 205 forms a guide bar mounting groove 205a concave to the rear so that the rear end of the guide bar 207 is inserted, and the rear end of the guide bar 207 may be inserted into has the guide bar mounting groove 205a and fixed thereto.

In addition, a guide bar mounting protrusion 208 may be formed at the front end of the fixing cover 200, and a guide bar mounting groove 209 concave to the front may be formed in the guide bar mounting protrusion 208. In addition, the front end of the guide bar 207 may be inserted into the guide bar mounting groove 209 and fixed thereto.

In addition, a guide bar passage hole through which the guide bar 207 passes may be formed in the moving cover 210. Therefore, when the moving cover 210 moves horizontally in a state where the guide bar 207 is inserted into the guide bar passage hole, the operation of the moving cover 210 can be guided in a straight line by the guide bar 207.

For example, an auxiliary protrusion 267 protruding rearward through the guide bar 207 may be formed on the gear bracket 265.

In addition, a guide bar passage hole 266 through which the guide bar 207 passes may be formed in the auxiliary protrusion 267.

A plurality of auxiliary protrusions 267 may be formed to be spaced apart from each other in the front and rear direction. In addition, each of the auxiliary protrusions 267 may have a guide bar passage hole 266 formed therein.

Therefore, it is possible to more reliably hold the clearance between the fixed cover 200 and the moving cover 210.

In addition, an anti-friction member 268 for reducing frictional force between the guide bar 207 and the auxiliary protrusion 267 may be inserted into each of the guide bar passage holes 266.

Accordingly, the horizontal movement operation of the moving cover 210 can proceed more smoothly.

When the guide bar 207 is provided as described above, one side of the moving cover 210 can be supported in contact with the guide bar 207, and the other side of the moving cover 210 can be supported in contact with the rack gear 206.

Therefore, while both sides of the moving cover 210 are supported in contact with the fixed cover 200, the clearance between the fixed cover 200 and the moving cover 210 is more reliably removed, and while the moving cover 210 moves horizontally in a straight line, the operation of the moving cover 210 can be stably maintained.

In addition, the present disclosure may further include a first sensor (not illustrated) provided in the case 10 or the water ejection unit 20 to detect the position of the container placed around the case 10.

In addition, the present disclosure may include a second sensor 254 (refer to FIG. 9) for detecting the amount of rotation, the rotational direction, the rotational speed of the driving motor 250, whether the load of the driving motor 250 is suddenly changed, and the like.

The second sensor 254 may be formed adjacent to the driving motor 250. Referring to FIG. 9, the driving motor 250 includes a separate connector 253 extending outward, and a second sensor 254 may be connected to the connector.

In addition, the present disclosure may further include a controller (not illustrated) connected to the input unit 230 and the first sensor (not illustrated) or the second sensor 254 to control the operation of the driving motor 250.

According to the water ejecting apparatus according to the embodiment of the present disclosure having the configuration as described above, there are the following effects.

First, there is an effect that the water ejection nozzle from which water is ejected by the driving motor can be moved in the horizontal direction.

In addition, there is an effect that the water ejection nozzle can performs the rotational operation and is provided to be movable in the horizontal direction as well, so that the interval between the case and the water ejection nozzle can be adjusted, thereby increasing user convenience.

In addition, there is an effect of preventing the shaking during the horizontal movement of the water ejection unit.

In addition, there is an effect that the position of the water ejection nozzle can be changed according to various container inlet sizes and positions where the containers are placed.

In addition, there is an effect that the water extraction nozzle is provided to be rotatable in the horizontal direction, so that the user can freely move the water extraction nozzle as needed.

In addition, there is an effect that the position of the water ejection nozzle can be moved in the front, rear, left, and right directions.

What is claimed is:

1. A liquid ejecting apparatus comprising:
a case; and
a liquid ejector at least partially protruding from the case and comprising:
a fixed cover connected to the case and including a rack gear that extends in a first direction, the fixed cover defining a first opening;
a moving cover received in the fixed cover and movable in the first direction or a second direction opposite to the first direction relative to the fixed cover;
a driving motor included in the moving cover and configured to engage with a gear assembly; and
a liquid ejection nozzle disposed at an end of the moving cover and configured to eject liquid,
wherein the moving cover is at least partially extended from the fixed cover based on the driving motor operating to move the moving cover in the first direction relative to the fixed cover,
wherein the moving cover is at least partially retracted from the fixed cover based on the driving motor operating to move the moving cover in the second direction relative to the fixed cover, and
wherein the fixed cover includes a second opening configured to receive the moving cover such that the moving cover moves out from the fixed cover through the second opening.

2. The liquid ejecting apparatus of claim 1, wherein a distance between the liquid ejection nozzle and the case is varied based on the operation of the driving motor.

3. The liquid ejecting apparatus of claim 1, wherein the first opening of the fixed cover is defined at a first surface of the fixed cover and extends along the first direction or the second direction, and
wherein the moving cover is configured to be at least partially exposed through the first opening of the fixed cover.

4. The liquid ejecting apparatus of claim 3, wherein the fixed cover includes first portions that extend toward each other in a direction perpendicular to the first direction or the second direction such that the first opening is defined at the first surface of the fixed cover.

5. The liquid ejecting apparatus of claim 4, wherein the moving cover has step portions that have a concave shape and are configured to be seated at the first portions of the fixed cover.

6. The liquid ejecting apparatus of claim 1, wherein each of the fixed cover and the moving cover has a convex shape.

7. The liquid ejecting apparatus of claim 1, further comprising:
a ring-shaped rotator rotatably disposed in the case,
wherein the fixed cover is connected to the rotator.

8. The liquid ejecting apparatus of claim 1, further comprising:
a sensor disposed in the case or the liquid ejector and configured to sense a container that is placed with respect to the case.

9. The liquid ejecting apparatus of claim 1, further comprising:
a top cover that forms a surface of the case or the liquid ejector;
an input device disposed at the top cover and configured to receive an instruction for controlling the driving motor or a liquid ejection pipe that is connected to the liquid ejection nozzle.

10. The liquid ejecting apparatus of claim 1, wherein the gear assembly comprises:
a gear bracket coupled to the moving cover; and
a pinion gear rotatably disposed in the gear bracket and engaged with the rack gear,
wherein the pinion gear is configured to rotate along the rack gear such that the moving cover moves in the first direction or the second direction with respect to the fixed cover based on the operation of the driving motor,
wherein the fixed cover further comprises:
a guide bar disposed in parallel to the rack gear and opposite to the rack gear,
wherein the gear bracket contacts and is supported by the guide bar,
wherein the gear bracket has a guide bar passage hole configured to receive the guide bar, and
wherein the liquid ejecting apparatus further comprises an anti-friction member inserted in the guide bar passage hole and configured to reduce frictional force with the guide bar.

11. A liquid ejecting apparatus comprising:
a case; and
a liquid ejector at least partially protruding from the case and comprising:
a fixed cover connected to the case and including a rack gear that extends in a first direction;
a moving cover received in the fixed cover and movable in the first direction or a second direction opposite to the first direction relative to the fixed cover;
a driving motor included in the moving cover and configured to engage with a gear assembly; and
a liquid ejection nozzle disposed at an end of the moving cover and configured to eject liquid,
wherein the moving cover is at least partially extended from the fixed cover based on the driving motor operating to move the moving cover in the first direction relative to the fixed cover, and
wherein the moving cover is at least partially retracted from the fixed cover based on the driving motor operating to move the moving cover in the second direction relative to the fixed cover,
wherein the gear assembly comprises:
a gear bracket coupled to the moving cover; and
a pinion gear rotatably disposed in the gear bracket and engaged with the rack gear,
wherein the pinion gear is configured to rotate along the rack gear such that the moving cover moves in the first direction or the second direction with respect to the fixed cover based on the operation of the driving motor.

12. The liquid ejecting apparatus of claim 3, wherein the fixed cover further comprises:
a guide bar disposed in parallel to the rack gear and opposite to the rack gear,
wherein the gear bracket contacts and is supported by the guide bar.

13. The liquid ejecting apparatus of claim 12, wherein the gear bracket has a guide bar passage hole configured to receive the guide bar.

14. The liquid ejecting apparatus of claim 13, further comprising:
an anti-friction member inserted in the guide bar passage hole and configured to reduce frictional force with the guide bar.

15. The liquid ejecting apparatus of claim 11, wherein the fixed cover further comprises:
a guide rail spaced apart from the rack gear and extending in the first direction, the guide rail including a plurality of seating recesses that are spaced apart in the first direction, and
wherein the gear bracket comprises a guide rail projection configured to contact the guide rail and be inserted into the plurality of seating recesses as the gear bracket moves in the first direction or the second direction.

16. The liquid ejecting apparatus of claim 12, wherein the guide bar is made of metal.

17. A liquid ejecting apparatus comprising:
a case; and
a liquid ejector at least partially protruding from the case and comprising:
a fixed cover connected to the case and including a rack gear that extends in a first direction;
a moving cover received in the fixed cover and movable in the first direction or a second direction opposite to the first direction relative to the fixed cover;
a driving motor included in the moving cover and configured to engage with a gear assembly; and
a liquid ejection nozzle disposed at an end of the moving cover and configured to eject liquid,
wherein the moving cover is at least partially extended from the fixed cover based on the driving motor operating to move the moving cover in the first direction relative to the fixed cover, and
wherein the moving cover is at least partially retracted from the fixed cover based on the driving motor operating to move the moving cover in the second direction relative to the fixed cover,
wherein the driving motor comprises:
a motor shaft; and
a motor gear connected to the motor shaft, and
wherein the gear assembly comprises:
a first gear engaged with the motor gear;
a second gear coaxially disposed with the first gear;
a third gear engaged with the second gear; and
a pinion gear coaxially disposed with the third gear and engaged with the rack gear.

18. The liquid ejecting apparatus of claim 17, wherein rotating shafts of the first gear, the second gear, the third gear, and the fourth gear are located above the motor shaft of the motor with respect to the first direction or the second direction.

19. The liquid ejecting apparatus of claim 17, wherein the fixed cover has a first side and a second side opposite to the first side with respect to the motor shaft of the motor,
wherein the rack gear is fixed at the first side of the fixed cover, and wherein the rotating shafts of the first gear, the second gear, the third gear, and the fourth gear are located at the first side in a staggered manner.

20. A liquid ejecting apparatus comprising:
    a case; and
    a liquid ejector at least partially protruding from the case and comprising:
        a fixed cover connected to the case and including a rack gear that extends in a first direction;
        a moving cover received in the fixed cover and movable in the first direction or a second direction opposite to the first direction relative to the fixed cover;
        a driving motor included in the moving cover and configured to engage with a gear assembly; and
        a liquid ejection nozzle disposed at an end of the moving cover and configured to eject liquid,
        wherein the moving cover is at least partially extended from the fixed cover based on the driving motor operating to move the moving cover in the first direction relative to the fixed cover, and
        wherein the moving cover is at least partially retracted from the fixed cover based on the driving motor operating to move the moving cover in the second direction relative to the fixed cover,
    wherein the liquid ejecting apparatus further comprises:
        a top cover that forms a surface of the case or the liquid ejector; and
        an input device disposed at the top cover and configured to receive an instruction for controlling the driving motor or a liquid ejection pipe that is connected to the liquid ejection nozzle,
    wherein the input device comprises a lifting input control, and
    wherein the liquid ejecting apparatus further comprises a controller configured to operate the driving motor to move the liquid ejection nozzle based on an input through the lifting input control.

* * * * *